(No Model.)  2 Sheets—Sheet 1.

J. GREGORY.
Ice Cutting Machine.

No. 239,094.  Patented March 22, 1881.

WITNESSES:—
A. C. Webb
Geo. G. Jewett.

INVENTOR:—
Jesse Gregory
By Ernest A. Webb
Atty (No Model.) 2 Sheets—Sheet 2.
J. GREGORY.
Ice Cutting Machine.
No. 239,094. Patented March 22, 1881.
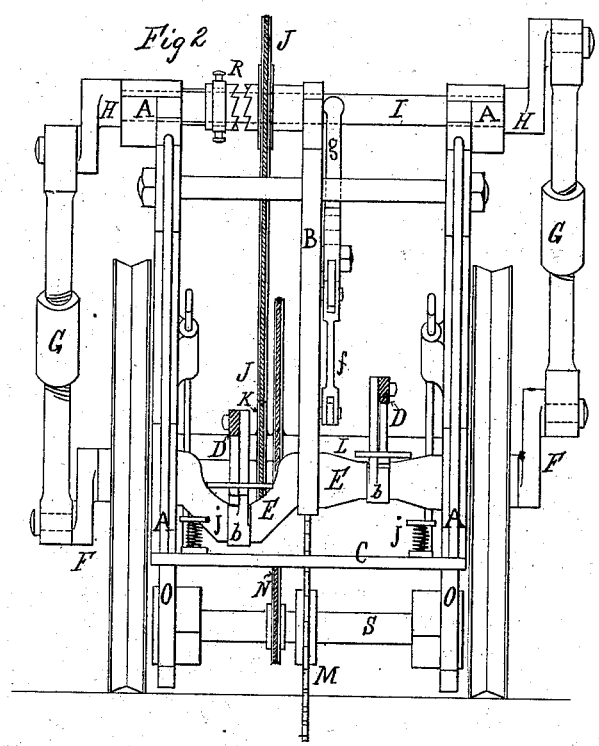
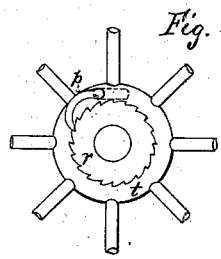
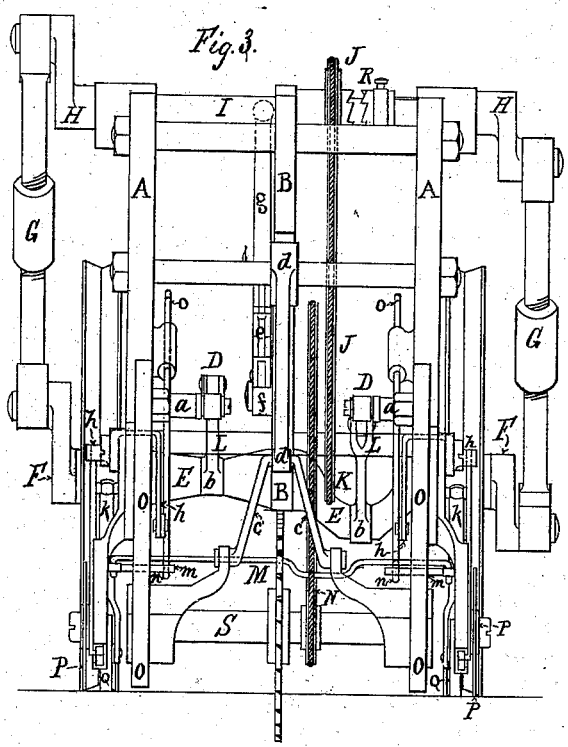
WITNESSES:—
H. C. Webb
Geo. G. Jewett.
INVENTOR:—
Jesse Gregory
By— Ernest Webb
Atty—

UNITED STATES PATENT OFFICE.

JESSE GREGORY, OF PORT MORRIS, ASSIGNOR TO HIMSELF AND FRANK FOWLER, OF DOVER PLAINS, NEW YORK.

ICE-CUTTING MACHINE.

SPECIFICATION forming part of Letters Patent No. 239,094, dated March 22, 1881.

Application filed January 28, 1881. (No model.)

*To all whom it may concern:*

Be it known that I, JESSE GREGORY, of Port Morris, in the county and State of New York, have invented a new and Improved Ice-Cutting Machine, of which the following specification is a description.

This invention relates particularly to improvements in machines for cutting ice, the object being to produce a machine for this purpose which can be driven and operated by the weight of the operator, thus doing away with the necessity of employing horse-power or steam-power, and thereby greatly lessening the cost of running such a machine.

The invention consists, first, in the arrangement of a pair of treadles or rock-arms above the platform of the machine, attached to and operated from the frame-work, by means of which, in connection with suitable mechanism, hereinafter described, motion can be imparted to a main axle for driving the running-gear and imparting a rotary motion to a shaft carrying the main driving-pulley, which, in turn, rotates a second pulley on a counter-shaft which drives the cutting-saw; second, in the arrangement of a link spanning the saw and connecting with a bell-crank, operated and adjusted by a hand-lever fixed within reach of the operator's position by means of a pitman or connecting-rod, and a second bell-crank for the purpose of raising and lowering the saw to clear the ice and to regulate the depth of the cut; third, in the arrangement of a pair of guide-wheels to gage the width of cut and relieve the saw from any side thrust, which can be raised and lowered by means of a bell-crank, connecting-rod, and spring-treadle, as hereinafter described; fourth, in the arrangement of adjustable supporting-wheels to take the weight of the forward part of the machine, and adapted to turn and guide it like the fifth-wheel of an ordinary wagon by means of a horizontal bell-crank attached to the fork-bearing of each wheel, a connecting-rod to take the place of an ordinary axle, and a rod connected to the remaining arm of the bell-crank of each wheel and extending to the platform for adjusting the wheels, as hereinafter described.

Figure 1:
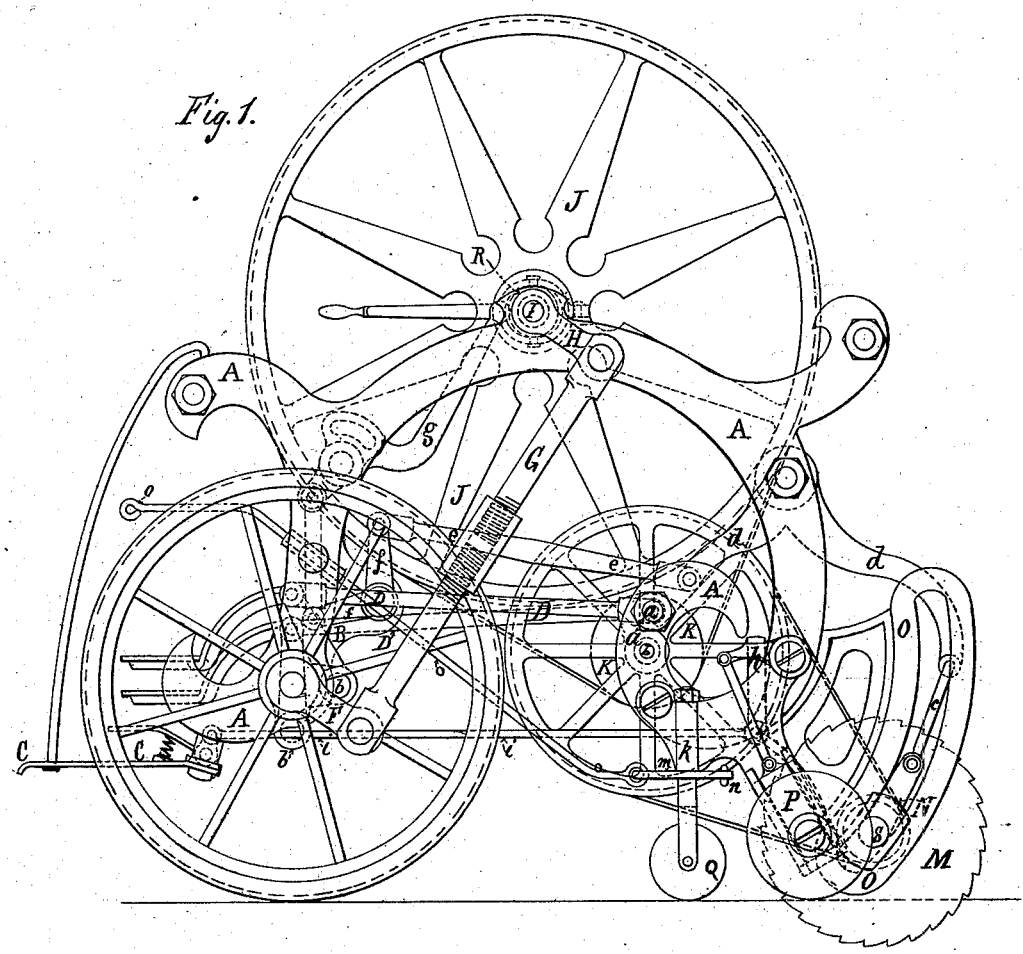
Figure 5:
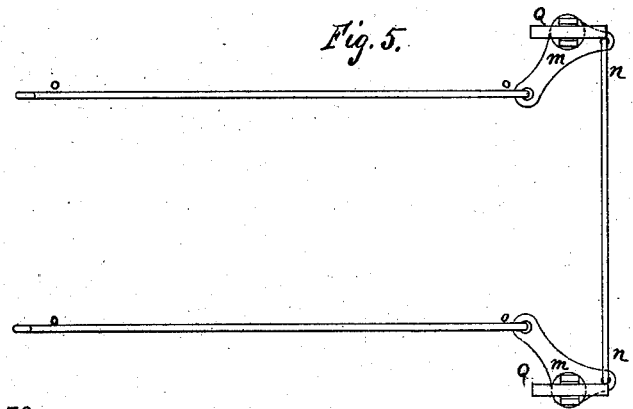

In the accompanying drawings, Figure 1 represents a side elevation of my improved ice-cutting machine. Fig. 2 is a rear elevation, showing the platform. Fig. 3 is a front elevation, showing the cutting-saw. Fig. 4 shows the ratchet as applied to the hub of one of the hind wheels, and Fig. 5 is a plan view of the guide-wheels.

Similar letters of reference indicate corresponding parts in all the figures.

In the drawings, A A designate the side frames, B the center frame, and C the platform.

For the construction and operation of this machine the side frames, A A, and center frame, B, are constructed to form the body of the wagon, to which the several parts to assist in the operation, and which form the working portion, are attached. At the rear and between the two large hind wheels is suspended the platform C to carry the operator.

Motion is given to the machine by means of a pair of treadles or rock-arms, D, attached to and operated from the side frames, A A, at *a a*, to rotate a main axle, E, by means of cranks *b b*. To the ends of the axle E cranks F F are attached, which, by means of adjustable pitmen G G and cranks H H, communicate a rotary motion to a shaft, I, carrying the main driving-pulley J, which, when a clutch, R, is thrown in, in turn rotates, by means of a belt, a pulley, K, on a counter-shaft, L, which, by means of a belt, drives a cutting-saw, M, and a pulley, N, upon the saw-mandrel S.

For the purpose of adjusting the saw to its work it is suspended in an arc-bearing, O, at the end of the saw-mandrel S, which arc is swept from the center of the counter-shaft L to provide for the proper working of the belt between the two pulleys K and N. According to the depth of the cut required, the saw M is raised or lowered, and when the machine is being moved to a new location the saw M is raised to the full height of the arc-bearing O to prevent damage and permit the easy running of the machine on the road. This raising and lowering is accomplished by means of a link, *c*, spanning the saw and connecting with a bell-crank, *d*, operated and adjusted by means of a communicating pitman, e, a bell-crank, f, and a hand-lever, g, within reach of the operator from the platform C.

P P designate a pair of wheels working in guides at the forward part of the machine, to gage the width and line of the cut to be made by the saw M and to relieve the saw from any side thrust. These wheels P P can be raised to clear the ice-level by means of bell-cranks h, connected by rods i to spring-treadles j on the platform C.

Q Q designate adjustable supporting-wheels to take the place of the forward portion of the machine, and forming the forward part of the running-gear of the wagon. These wheels are kept in place vertically by sleeve-bearings k, and are adjustable for use, when running the machine to duty or on the road, for the purpose of turning and guiding the wagon in a similar manner to the fifth-wheel of an ordinary wagon by the following means: Attached to the fork-bearing of each wheel Q Q is a horizontal bell-crank, m, connected to each other by a rod, n, so as to act in unison and keep the wheels Q Q parallel to each other at all times, this connection taking the place of the ordinary forward axle of a wagon. To adjust these wheels a rod, o, worked from the platform, is connected to the remaining arm of each of the bell-cranks m. When these wheels Q Q are kept in line with the machine it moves in a straight line, and when kept at an angle the machine turns in the direction indicated by the wheels. In turning a quick curve it is necessary to relieve either one or both of the main driving-wheels. In the example of my invention illustrated by the drawings this is accomplished by means of a pawl, b, and ratchet r, attached to the hub of the wheel t, as shown in Fig. 4.

The pulley J, when not required for service, runs loosely on the shaft I, and is thrown into operation by means of the clutch R, attached to the shaft I, and operated by means of a lever from the platform C.

In operating this machine the operator stands on the treadles D, and by bearing his weight first on one and then on the other motion is imparted to the driving-wheels and saw-operating mechanism, as described. The machine can be run and will do its work efficiently by this motive power alone, thus doing away with the necessity of employing steam or horse-power, although, of course, either may be attached and used, if desired.

This machine, when run by the operator alone, will cut as much ice in a day as eight ordinary ice-cutting machines, eight horses, and sixteen men, and will consequently very much lessen the cost of cutting ice on rivers, lakes, and ponds. It can be efficiently operated by one man, and will run easily on the ice, as the main driving-wheels are grooved to give them a firm gripe on the ice and prevent sliding.

By throwing the cutting mechanism out of gear the machine can also be run on roads, and can be taken from place to place in this manner.

A machine constructed on this principle, when combined with suitable appliances, can also be used for mowing lawns, shoveling snow off ice, roads, and walks, and for many other purposes; but I do not propose to make any specific claim in this application for these several modifications.

What I claim as my invention, and desire to secure by Letters Patent, is—

1. In a machine for cutting ice, the arrangement of a pair of treadles or rock-arms attached to and operated from the frame-work, by means of which motion can, by the weight of the operator, be imparted to a main axle for driving the running-gear and cutting mechanism, substantially as described, for the purposes specified.

2. In a machine for cutting ice, the arrangement of a circular saw in an arc-bearing, adapted to rotate on a saw-mandrel by means of a belt working in a pulley on the saw-mandrel and driven by connection with the main axle, to which motion is imparted by a pair of treadles or rock-arms, substantially as described, for the purposes specified.

3. In a machine for cutting ice, the arrangement of a link spanning the cutting-saw and connecting with a bell-crank operated and adjusted by a hand-lever by means of a pitman or connecting-rod, and a second bell-crank for the purpose of raising and lowering the saw in the arc-bearing, substantially as described, for the purposes specified.

4. In a machine for cutting ice, a main driving-wheel arranged to rotate on a shaft supported by the frame-work, and adapted to impart motion to a pulley on a counter-shaft, which, in turn, drives a second pulley fixed on a saw-mandrel to rotate a circular saw, by means of cranks connecting the shaft to adjustable pitmen, driven from the main axle by a pair of treadles or rock-arms, substantially as described, for the purposes specified.

5. In a machine for cutting ice, the arrangement of a pair of wheels working in guides to gage the width of the cut, and adapted to be raised and lowered from the platform by means of bell-cranks, connecting-rods, and spring-treadles, substantially as described, for the purposes specified.

6. In a machine for cutting ice, a pair of adjustable supporting-wheels working in sleeve-bearings to form part of the running-gear and take the weight of the forward part of the machine, and adapted to be worked from the platform to turn and guide the machine by means of a horizontal bell-crank attached to the fork-bearing of each wheel, a connecting-rod to take the place of an ordinary axle, and a rod connected to the remaining arm of the bell-crank of each wheel and extending to the platform, substantially as described, for the purposes specified.

7. In a machine for cutting ice having the side frames, A A, center frame, B, and platform C, the combination of the treadles or rock-arms D, cranks b b, axle E, driving-wheels, adjustable wheels Q Q, supported by sleeve-bearings k, connecting-rod n, bell-cranks m, and rods o, with the cranks F F, pitmen G G, cranks H H, shaft I, driving-pulley J, pulley K, counter-shaft L, pulley N, saw-mandrel S, arc-bearing O, and saw M, all constructed and arranged substantially as described, for the purposes described.

8. In a machine for cutting ice having the side frames, A A, center frame, B, and platform C, the combination of the treadles or rock-arms D, cranks b b, axle E, driving-wheels, adjustable wheels Q Q, supported by sleeve-bearings k, connecting-rod n, bell-cranks m, and rods o, and the guide-wheels P P, bell-cranks h, rods i, and spring-treadles j, with the cranks F F, pitmen G G, cranks H H, shaft I, driving-pulley J, counter-shaft L, pulley N, saw-mandrel S, and saw M, and adapted to be raised and lowered in the arc-bearing O by means of the links c, bell-crank d, pitman e, bell-crank f, and lever g, all constructed and arranged substantially as described, for the purposes specified.

9. In a machine for cutting ice having the side frames, A A, center frame, B, and platform C, the combination of the treadles or rock-arms D, cranks b b, axle E, driving-wheels, adjustable wheels Q Q, supported by sleeve-bearings k, connecting-rod n, bell-cranks m, and rods o, and the guide-wheels P P, bell-cranks h, rods i, and spring-treadles j with the cranks F F, pitmen G G, cranks H H, shaft I, and driving-pulley J, rotating loosely on the shaft I, and adapted to be engaged and disengaged by a clutch, R, operated by a lever from the platform C, and with the counter-shaft L, pulley N, saw-mandrel S, saw M, arc-bearing O, link c, bell-crank d, pitman e, bell-crank f, and lever g, all constructed and arranged substantially as described, for the purposes specified.

10. In a machine for cutting ice having the side frames, A A, center frame, B, and platform C, the combination of the treadles or rock-arms D, cranks b b, axles E, driving-wheel t, pawl p, and ratchet r, adjustable wheels Q Q, sleeve-bearings k, connecting-rod n, bell-cranks m, and rods o, guide-wheels P P, bell-cranks h, rods i, and spring-treadles j with the cranks F F, pitmen G G, cranks H H, shaft I, and driving-pulley J, controlled by clutch R and its connecting-lever, and with the counter-shaft L, pulley N, saw-mandrel S, saw M, arc-bearing O, link c, bell-crank d, pitman e, bell-crank f, and lever g, all constructed and arranged substantially as described, for the purposes specified.

The foregoing description of my invention signed by me this 10th day of January, A. D. 1881.

JESSE GREGORY.

Witnesses:
ERNEST C. WEBB,
GEO. G. JEWETT.